(12) United States Patent
Morosawa et al.

(10) Patent No.: US 11,414,052 B2
(45) Date of Patent: Aug. 16, 2022

(54) VEHICLE CONTROL SYSTEM AND VEHICLE CONTROL METHOD

(71) Applicant: HONDA MOTOR CO., LTD., Tokyo (JP)

(72) Inventors: Ryo Morosawa, Tokyo (JP); Haisong Liu, Tokyo (JP); Akira Nakajima, Tokyo (JP); Kenji Okuma, Tokyo (JP); Hiroaki Maruyama, Tokyo (JP); Yoshikazu Matsuo, Tokyo (JP); Shuto Higashi, Tokyo (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/329,495

(22) Filed: May 25, 2021

(65) Prior Publication Data

US 2021/0370878 A1    Dec. 2, 2021

(30) Foreign Application Priority Data

May 27, 2020    (JP) .............................. JP2020-092174

(51) Int. Cl.
*B60R 25/25* (2013.01)
*B60R 25/31* (2013.01)
(Continued)

(52) U.S. Cl.
CPC .............. *B60R 25/25* (2013.01); *B60R 25/01* (2013.01); *B60R 25/102* (2013.01);
(Continued)

(58) Field of Classification Search
CPC ....... B60R 25/25; B60R 25/01; B60R 25/102; B60R 25/305; B60R 25/31; G06V 40/174; G06V 40/172; G06V 40/20
See application file for complete search history.

(56) References Cited

U.S. PATENT DOCUMENTS 9,576,189 B2 *    2/2017    Lim .................. G06V 40/16
2013/0002870 A1 *    1/2013    Cieler .................... B60R 25/10
348/148

(Continued)

FOREIGN PATENT DOCUMENTS

JP    2003-138817    5/2003

*Primary Examiner* — Thomas D Alunkal
(74) *Attorney, Agent, or Firm* — Rankin, Hill & Clark LLP

(57) ABSTRACT

The present invention includes: a vehicle exterior image acquisition unit acquiring a vehicle exterior image being an image of an external surrounding of a vehicle; a vehicle interior image acquisition unit acquiring a vehicle interior image being an image of an interior of the vehicle; a person recognition unit respectively recognizing, based on the vehicle exterior and interior images, motions of a person outside the vehicle and a person in the vehicle; and a door control unit controlling a state of a door of the vehicle, wherein, if a person outside the vehicle approaching the vehicle has been recognized based on a recognition result of the person recognition unit, the door control unit executes an opening operation on the door if it has been determined that the person in the vehicle has performed a specific motion determined in advance regarding the approaching person outside the vehicle.

8 Claims, 3 Drawing Sheets

(51) Int. Cl.
  B60R 25/01   (2013.01)
  B60R 25/102  (2013.01)
  B60R 25/30   (2013.01)
  G06V 40/20   (2022.01)
  G06V 40/16   (2022.01)

(52) U.S. Cl.
  CPC ............ B60R 25/305 (2013.01); B60R 25/31 (2013.01); G06V 40/172 (2022.01); G06V 40/174 (2022.01); G06V 40/20 (2022.01)

(56) References Cited

U.S. PATENT DOCUMENTS

| | | | | |
|---|---|---|---|---|
| 2013/0275008 | A1* | 10/2013 | Breed | E05F 15/73 |
| | | | | 701/49 |
| 2013/0307771 | A1* | 11/2013 | Parker | G06F 3/167 |
| | | | | 345/158 |
| 2016/0300410 | A1* | 10/2016 | Jones | B60R 25/2045 |
| 2018/0068510 | A1* | 3/2018 | Atsumi | B60R 25/25 |
| 2018/0290627 | A1* | 10/2018 | Hariri | B60R 25/245 |

* cited by examiner

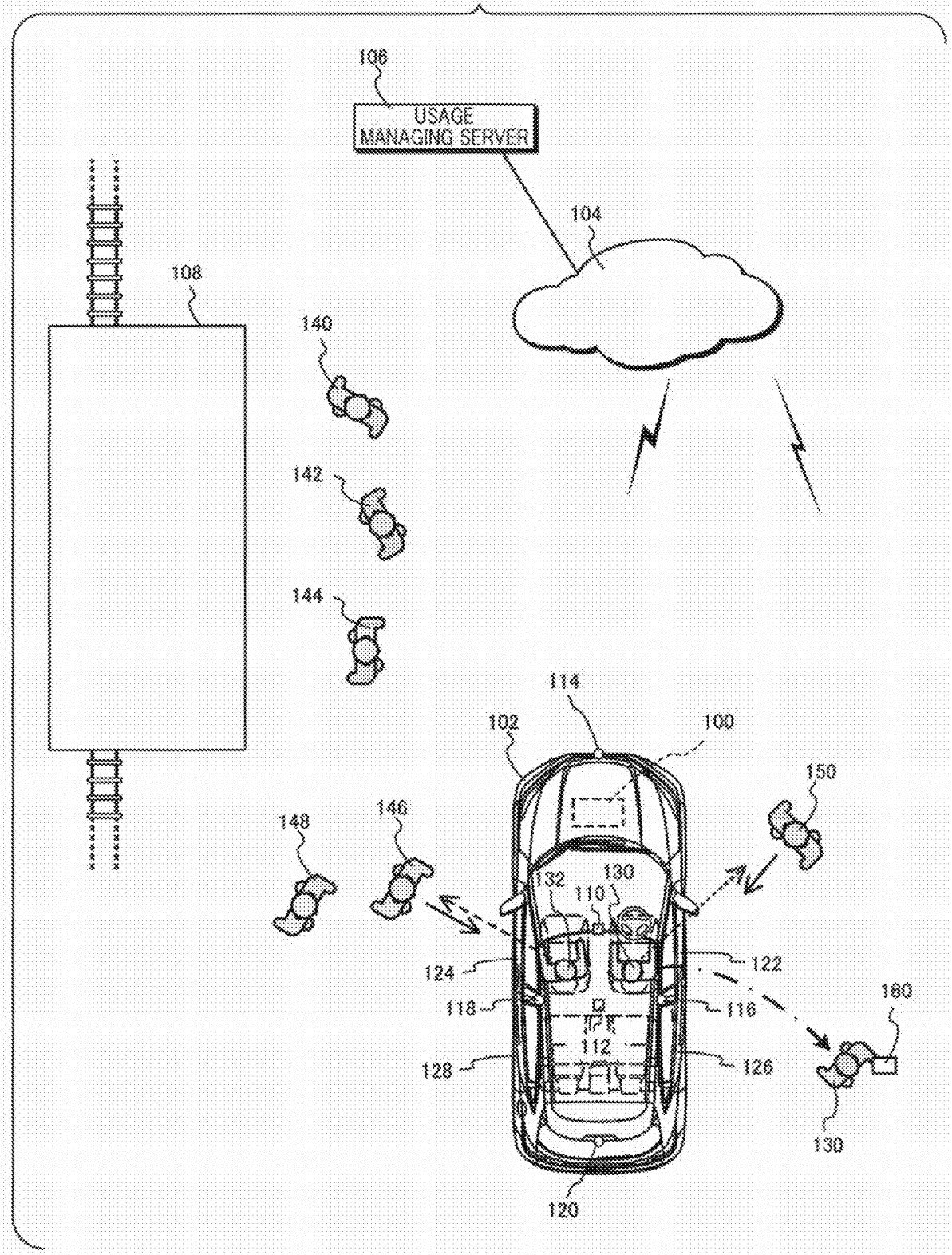

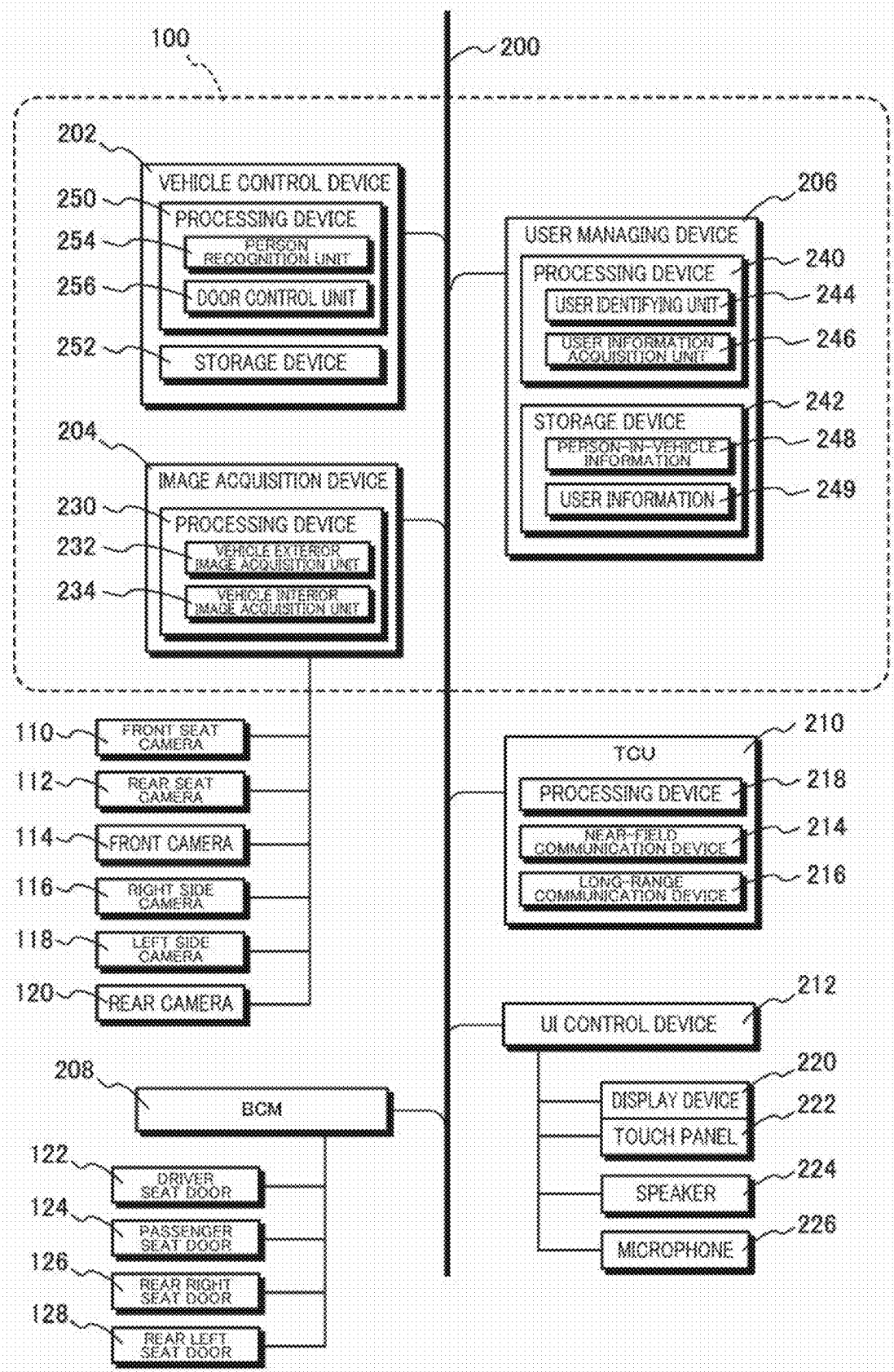

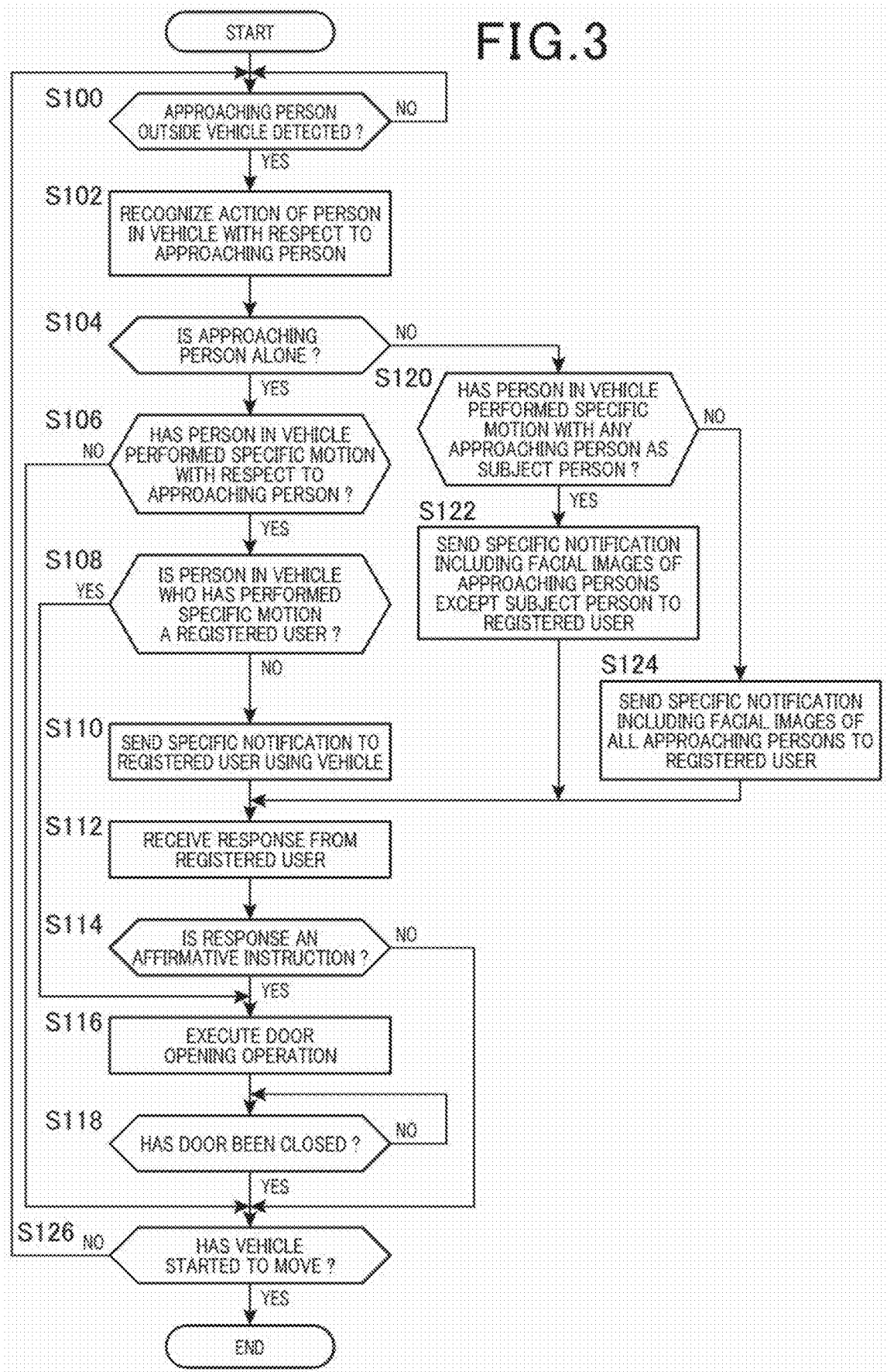

VEHICLE CONTROL SYSTEM AND VEHICLE CONTROL METHOD

INCORPORATION BY REFERENCE

The present application claims priority under 35 U.S.C. § 119 to Japanese Patent Application No. 2020-092174 filed on May 27, 2020. The content of the application is incorporated herein by reference in its entirety.

BACKGROUND OF THE INVENTION

Field of the Invention

The present invention relates to motion control of onboard equipment, and particularly relates to a vehicle control system and a vehicle control method controlling the operation relating to opening and closing of vehicle doors.

Description of the Related Art

Entry systems for vehicles that utilize image authentication are known in the conventional art (for example, see Japanese Patent Publication Laid-Open No. 2003-138817). This entry system includes a peripheral monitoring device that detects a person approaching the vehicle using radio waves, ultrasonic waves, infrared light, or a peripheral image of the vehicle, and when a person approaching the vehicle is detected, an image of the person is captured, and identification of the person is carried out using the person's iris. The system is configured to unlock the door if the identification is successful.

According to the above conventional entry system, a person whose iris image is registered in advance may unlock the door simply by approaching the vehicle, which relieves the burden on the user when boarding the vehicle. However, scenarios in which unlocking and other automatic operation of the doors relating to opening and closing operation of the doors is desirable may include not only a scenario in which the registered user him- or herself boards the vehicle, but also, for example, a scenario in which the user uses the vehicle to go to pick up another person and the other person boards the vehicle.

In this case, a method for automatically unlocking the door when the other person approaches may include advance registration of information for determining whether or not the person approaching the vehicle is a person to be picked up into the vehicle. However, registering every person who may board the vehicle would make preparations for using the vehicle cumbersome and inconvenient.

SUMMARY OF THE INVENTION

Problem to be Solved by the Invention

An object of the present invention is to enable vehicle control for controlling an operation relating to opening and closing of the vehicle doors which ensures security of the vehicle while allowing people other than registered vehicle users to smoothly board the vehicle.

Means for Solving the Problem

An aspect of the present invention is a vehicle control system including: a vehicle exterior image acquisition unit that acquires a vehicle exterior image, which is an image of an external surrounding of a vehicle; a vehicle interior image acquisition unit that acquires a vehicle interior image, which is an image of an interior of the vehicle; a person recognition unit that respectively recognizes, based on the vehicle exterior image and the vehicle interior image, motions of a person outside the vehicle and a person in the vehicle; and a door control unit that controls a state of a door of the vehicle, wherein, if a person outside the vehicle approaching the vehicle has been recognized based on a recognition result of the person recognition unit, the door control unit executes an opening operation on the door if it has been determined that the person in the vehicle has performed a specific motion determined in advance with respect to the approaching person outside the vehicle.

According to another aspect of the present invention, the door control unit executes the opening operation on the door if each of the person in the vehicle and the approaching person outside the vehicle performs any of some specific motions determined in advance with each other as a subject person.

According to another aspect of the present invention, the specific motion is to keep directing one's face or gaze toward a subject person for a predetermined period of time or longer.

According to another aspect of the present invention, the specific motion is a specific facial expression being formed or a specific gesture being performed with respect to a subject person.

According to another aspect of the present invention, the vehicle control system further includes a user identifying unit configured to determine whether or not the person in the vehicle is a registered user who has been registered in advance as a user of the vehicle, wherein the door control unit sends a specific notification to the registered user of the vehicle if the person in the vehicle who has performed the specific motion with the approaching person outside the vehicle as a subject person is not the registered user, and executes the opening operation on the door when the registered user has returned an affirmative instruction with respect to the specific notification.

According to another aspect of the present invention, the vehicle control system further includes a user identifying unit configured to determine whether or not the person in the vehicle is a registered user who is registered in advance as a user of the vehicle, wherein the door control unit, if the person recognition unit has recognized a plurality of the approaching persons outside the vehicle, sends a notification including facial images of the recognized plurality of approaching persons outside the vehicle to the registered user, and executes the opening operation on the door when the registered user has returned an affirmative instruction with respect to the notification.

According to another aspect of the present invention, among the recognized plurality of approaching persons outside the vehicle, the door control unit does not include in the notification a facial image of a subject person of the specific motion of the person in the vehicle.

According to another aspect of the present invention, the opening operation is an automatic operation of opening the door, or an operation of setting the door to be openable from outside the vehicle.

Another aspect of the present invention is vehicle control method executed by a computer performing vehicle control, the method including the steps of: acquiring a vehicle exterior image, which is an image of an external surrounding of a vehicle; acquiring a vehicle interior image, which is an image of an interior of the vehicle; respectively recognizing, based on the vehicle exterior image and the vehicle interior image, motions of a person outside the vehicle and a person in the vehicle; and controlling a state of a door of the vehicle; wherein at the step of controlling, if a person outside the vehicle approaching the vehicle has been recognized based on a recognition result of the step of recognizing, an opening operation of the door is executed if it has been determined that the person in the vehicle has performed a specific motion determined in advance with respect to the approaching person outside the vehicle.

Effects of the Invention

According to an aspect of the present invention, it is possible to enable vehicle control for controlling an operation relating to opening and closing of the vehicle doors which ensures security of the vehicle while allowing people other than registered vehicle users to smoothly board the vehicle.

BRIEF DESCRIPTION OF THE DRAWINGS

FIG. 1 shows an example of a scenario in which a vehicle equipped with a vehicle control system according to an embodiment of the present invention is used;

FIG. 2 shows a configuration of a vehicle control system according to an embodiment of the present invention; and FIG. 3 is a flowchart exemplarily showing a procedure of an operation of the vehicle control system shown in FIG. 2.

DETAILED DESCRIPTION OF THE PREFERRED EMBODIMENTS

An embodiment of the present invention will be described below with reference to the drawings. FIG. 1 shows an example of a scenario in which a vehicle control system according to an embodiment of the present invention is used. The vehicle control system 100 according to the present embodiment is composed of, for example, a plurality of electronic control units (ECUs) installed in a vehicle 102, and controls an opening operation of the seat doors of the vehicle 102.

The vehicle control system 100 is communicably connected via a communication network 104 to a usage managing server 106 (computer) which is provided, for example, outside the vehicle 102. The communication network 104 may be, for example, an open network such as the Internet, or a private network. The usage managing server 106 stores information on users of the vehicle 102 registered in advance (registered users).

The vehicle 102 includes a front seat camera 110 and a rear seat camera 112 which are internal cameras for capturing images of the vehicle interior. The front seat camera 110 is provided, for example, on the rear-view mirror, and captures images of the front half area of the interior of the vehicle 102. The rear seat camera 112 is provided, for example, on the inner surface of the ceiling of the vehicle interior, and captures images of the rear half area of the vehicle interior.

In addition, the vehicle 102 includes a front camera 114, a right side camera 116, a left side camera 118, and a rear camera 120, which are external cameras for capturing images of the vehicle's surroundings. The front camera 114 is provided, for example, on the front bumper, and captures images of the area in front of the vehicle 102 out of the surroundings. The right side camera 116 and the left side camera 118 are provided, for example, on the right-side pillar and left-side pillar of the vehicle 102, and respectively capture images of an area to the right and an area to the left of the vehicle 102 out of the surroundings. The rear camera 120 is provided, for example, on the rear bumper or the upper portion of the tailgate, and captures images of the area behind the vehicle 102 out of the surroundings.

The vehicle 102 may be used, for example, by each of a plurality of registered users who are registered in advance in the usage managing server 106 as users of the vehicle 102. The vehicle 102 may be, for example, a private vehicle or a carshare vehicle.

In the example shown in FIG. 1, the vehicle 102 includes four doors; driver seat door 122 and passenger seat door 124 which are front seat doors, and rear right seat door 126 and rear left seat door 128 which are rear seat doors. The vehicle control system 100 of the vehicle 102 controls an opening operation of the above four doors of the vehicle 102 based on actions of a person in the interior of the vehicle 102 (person in vehicle) and actions of a person outside the vehicle 102 (person outside vehicle).

Here, a door opening operation refers to an operation of setting the door in a state that allows a person outside the vehicle to board the vehicle 102, and may include, in addition to simply unlocking the door, an operation of automatically opening the door using an actuator provided to the door. Further, for example, for door types in which the handle (door handle or doorknob) for opening and closing the door is stowed inside the door body, unlocking of the door lock as described above may include ejecting the door handle from the door body using an actuator to allow a person outside the vehicle to open the door.

In the scenario shown in FIG. 1, for example, a person 130 who is the current user and registered user of the vehicle 102 is in the vehicle 102 together with a person 132 who is an unregistered user, and is arriving at a station 108 to pick up an acquaintance. The person 132 who is an unregistered user may be, for example, a child or family member, or a friend or acquaintance, etc. of the person 130 who is a registered user. Outside the vehicle 102, persons 140, 142, 144, 146, 148, 150 who have emerged from the station 108 are moving in their respective desired directions.

The persons 146, 150 outside the vehicle are the ones to be picked up by the persons 130, 132 in the vehicle 102, and have spotted the vehicle 102 of the persons 130, 132 and are moving towards the vehicle 102.

In the above scenario, the vehicle control system 100 acquires vehicle exterior images, which are images of the external surroundings of the vehicle 102, using the front camera 114, right side camera 116, left side camera 118, and rear camera 120, which are external cameras. In addition, the vehicle control system 100 acquires vehicle interior images, which are images of the interior of the vehicle 102, using the front seat camera 110 and the rear seat camera 112, which are internal cameras. Here, the vehicle exterior images and vehicle interior images may be acquired as moving images (video), or as still images acquired repeatedly at predetermined time intervals.

The vehicle control system 100 respectively recognizes the motions of persons outside the vehicle and persons in the vehicle based on the acquired vehicle exterior images and vehicle interior images. Then, if a person outside the vehicle approaching the vehicle 102 (approaching person) has been recognized (or detected), the vehicle control system 100 executes an opening operation on a door of the vehicle 102 if it has been determined that the person in the vehicle has performed a specific motion determined in advance with respect to the approaching person outside the vehicle.

Here, the specific motion may be a characteristic motion a person performs when encountering a person or an acquaintance (hereinafter referred to simply as "acquaintance, etc.") he or she has been looking for (for example, a motion expressing joy or happiness, or a motion to draw attention to oneself). Such a specific motion may be, for example, focusing on the person in question, in other words turning one's gaze and/or face toward the subject person for a predetermined amount of time or longer. Alternatively, the specific motion may be forming a specific facial expression toward the subject person, and/or performing a specific gesture toward the subject person. The specific facial expression may be any expression that people generally make when seeing someone they know, or specific to individual registered users, such as grinning, smiling, a look of recognition (for example, a slight opening of the mouth when thinking "aha!"), winking, short, repeated blinking, etc.

In addition, the above gesture may be any movement of the body or hands performed to greet a person or draw a person's attention, such as raising one or both hands, waving one or both hands, bowing, raising an open hand, knocking on the door window, etc. Further, the above specific motion may include uttering a sound, such as the sound a person might utter when spotting an acquaintance, etc., for example, "Hey", "Mr./Ms. X" (where "X" is a person's name), "Oh, there he/she is", etc. Identification of the subject person of the above specific motion may be performed by detecting a person present in the direction in which the person performing the specific motion directs his or her gaze or face.

In the scenario shown in FIG. 1, the person 130 sitting in the driver seat of the vehicle 102 is directing his or her gaze (dotted arrow in the drawing) toward the person 150 outside the vehicle approaching the vehicle 102 as the subject person, and thus, the vehicle control system 100 detects this and performs an opening operation on, for example, the rear right seat door 126, which is the closest to the person 150.

In general, a person in a vehicle tends to, upon spotting someone he or she knows outside the vehicle, perform a specific action such as smiling, waving, bowing, etc. When the vehicle control system 100 has detected a person outside the vehicle approaching the vehicle 102, the vehicle control system 100 performs a door opening operation on the condition that a person in the vehicle 102 performs a specific motion with respect to the approaching person outside the vehicle as described above, which allows for supporting smooth boarding by a person outside the vehicle who is highly likely to be an acquaintance etc. of the person in the vehicle. In addition, the above door opening operation is performed when a person is present in the vehicle, so in a case where the door opening operation has been performed with respect to a person outside the vehicle who is not an acquaintance etc. of the person in the vehicle, boarding by the person who is not an acquaintance can be prevented by the presence of the person in the vehicle or by a correction operation performed by the person in the vehicle (for example, an operation for disabling the door opening operation), which can ensure security of the vehicle.

In order to make the above door opening operation be performed more reliably with respect to a person outside the vehicle who is an acquaintance, etc. of the person in the vehicle, the vehicle control system 100 may be configured to execute the door opening operation when each of the person outside the vehicle approaching the vehicle 102 and the person in the vehicle 102 performs any of the above specific motions determined in advance with each other as the subject person.

Further, in order to have the door opening operation be performed under the management of a person in the vehicle who is a registered user, the vehicle control system 100 may be configured so that when the person in the vehicle performing the specific motion with respect to the person outside the vehicle approaching the vehicle 102 is not a registered user, the vehicle control system 100 sends a specific notification to a person who is a registered user of the vehicle 102, and executes the door opening operation when the person who is the registered user has returned an affirmative instruction with respect to the notification. The notification may include, for example, a facial image of the person outside the vehicle who is subject to the specific motion performed by the person in the vehicle who is not a registered user.

In the scenario shown in FIG. 1, the person 132 who is an unregistered user sitting in the passenger seat of the vehicle 102 is directing his or her gaze (dashed arrow in the drawing) toward the person 146 outside the vehicle approaching the vehicle 102 as a subject person, and thus the vehicle control system 100 detects this. Then, since the person 132 is an unregistered user, the vehicle control system 100 sends a specific notification to the person 130 who is a registered user. When the person 130 has returned an affirmative instruction with respect to this notification, the vehicle control system 100 performs an opening operation on, for example, the rear left seat door 128, which is the closest to the person 146. Here, the notification may include a facial image of the person 146.

In addition, when the person 130 who is a registered user is in the vehicle 102, the above notification may be performed using a display device (not shown in FIG. 1) of the vehicle 102. Alternatively, when the person 130 who is a registered user is away from the vehicle 102 as shown by the dash-dot arrow in FIG. 1, the notification may be performed using a mobile terminal 160 (smartphone, computer) of the person 130 who is the registered user.

In addition, when the vehicle control system 100 has detected a plurality of persons outside the vehicle approaching the vehicle 102, the vehicle control system 100 sends a notification including facial images of the plurality of persons outside the vehicle to the person in the vehicle who is a registered user. For example, in the scenario shown in FIG. 1, when the person 148 also approaches the vehicle 102 in addition to the person 146, the vehicle control system 100 detects these approaching persons, and sends a specific notification including facial images of the persons 146, 148 to the person 130 in the vehicle who is a registered user.

Then, when the person 130 in the vehicle who is a registered user has returned an affirmative instruction with respect to the notification, the vehicle control system 100 executes the door opening operation. As described above, the notification may be performed using an onboard display device or the mobile terminal 160 of the person 130. This allows the person 130 who is a registered user to determine reliably whether or not the plurality of approaching persons are acquaintances and permit the door opening operation, which improves security of the vehicle 102.

Further, when the vehicle control system 100 performs the notification including the facial images of the plurality of persons 146, 148 when these persons are approaching, for example, the facial image of the person 146 outside the vehicle, who is the subject person of the specific motion performed by the person 132 in the vehicle, may be excluded from the notification. This limits the number of facial images included in the notification, allowing the person 130 who is a registered user to determine whether to permit the door opening operation more swiftly and reliably.

Next, with reference to FIG. 2, the configuration of the vehicle control system 100 will be described. In the present embodiment, the vehicle control system 100 is composed of a vehicle control device 202, an image acquisition device 204, and a user managing device 206, which are onboard electronic control units (ECUs).

The vehicle control device 202, the image acquisition device 204, and the user managing device 206 are communicably connected via an onboard network bus 200. Further connected to the onboard network bus 200 are a body control module (BCM) 208, a telematic control unit (TCU) 210, and a user interface (UI) control device 212.

The BCM 208 includes a processing device such as a CPU (not shown), and controls actuators provided to the driver seat door 122, the passenger seat door 124, the rear right seat door 126, and the rear left seat door 128 of the vehicle 102, in order to control an opening operation of these doors.

The TCU 210 includes a near-field communication device 214 (transmitter/receiver, circuit), a long-range communication device 216 (transmitter/receiver, circuit), and a processing device 218 that controls operations of these communication devices. The processing device 218 is, for example, a computer having a processor such as a CPU. The near-field communication device 214 is, for example, a wireless communication device that communicates with the mobile terminal 160 etc. according to the Bluetooth(R) communication standard. The long-range communication device 216 is a wireless communication device for communicating with, for example, the usage managing server 106 and the mobile terminal 160, etc. via the communication network 104.

The UI control device 212 includes a processing device such as a CPU (not shown), displays images on a display device 220 (display) provided to the interior of the vehicle 102 based on instructions from other devices of the vehicle 102 such as the vehicle control device 202, and outputs audio from a speaker 224. The UI control device 212 also acquires audio from the vehicle interior from a microphone 226, performs audio recognition processing on the audio, and outputs the audio and/or the result of the audio recognition processing to the other devices. The UI control device 212 also acquires instructions and/or data input from an occupant of the vehicle 102 via a touch panel 222 provided on a display screen of the display device 220, and outputs the acquired instructions and/or data to the other devices.

The image acquisition device 204 constituting the vehicle control system 100 includes a processing device 230 which is a computer including a processor such as a CPU, and includes as functional elements or functional units a vehicle exterior image acquisition unit 232 and a vehicle interior image acquisition unit 234. These functional elements are realized, for example, by the processing device 230, which is a computer, executing a program. This computer program may be stored on any computer-readable storage medium. As an alternative, part or all of the above functional elements of the processing device 230 may be constituted by hardware including respectively one or more electronic circuit components.

The vehicle exterior image acquisition unit 232 controls the front camera 114, the right side camera 116, the left side camera 118, and the rear camera 120, and acquires vehicle exterior images, which are images of the external surroundings of the vehicle 102, from these external cameras. In addition, the vehicle interior image acquisition unit 234 controls the front seat camera 110 and the rear seat camera 112, and acquires vehicle interior images, which are images of the interior of the vehicle 102, from these internal cameras. The vehicle exterior images and the vehicle interior images may be still images captured repeatedly at predetermined time intervals, or a video with a predetermined framerate. The image acquisition device 204 outputs the acquired vehicle exterior images and vehicle interior images to the other devices via the onboard network bus 200.

The user managing device 206 constituting the vehicle control system 100 determines whether or not a person in the vehicle is a registered user who has been registered in advance as a user of the vehicle 102.

Specifically, the user managing device 206 includes a processing device 240 and a storage device 242. The storage device 242 is composed of, for example, a volatile and/or non-volatile semiconductor memory, and/or a hard disk device, etc. The processing device 240 is, for example, a computer having a processor such as a CPU. The processing device 240 includes as functional elements or functional units a user identifying unit 244 and a user information acquisition unit 246.

These functional elements of the processing device 240 are realized, for example, by the processing device 240, which is a computer, executing a program. This computer program may be stored on any computer-readable storage medium. As an alternative, part or all of the above functional elements of the processing device 240 may be constituted by hardware including respectively one or more electronic circuit components.

The user identifying unit 244 receives a vehicle interior image from the image acquisition device 204, and, based on the received vehicle interior image, performs facial image authentication on each person in the vehicle 102 to identify whether or not the person in the vehicle is a registered user. Specifically, the user identifying unit 244 acquires from the usage managing server 106 a facial image of each registered user already registered in the usage managing server 106 and compares them to the facial image of the person in the vehicle in the vehicle interior image to determine whether or not each person in the vehicle is a registered user.

The user identifying unit 244 stores, in the storage device 242, person-in-vehicle information 248 composed of, for example, a facial image of each person in the vehicle and identification information indicating whether each person in the vehicle is a registered user or an unregistered user. The identification information may include, for example, an identification (ID) etc. assigned in advance to each registered user. In this way, of the persons in the vehicle 102, a person in the vehicle whose identification information including the ID is stored in association with the facial image in the person-in-vehicle information 248 can be determined to be a registered user.

The user identifying unit 244 also identifies a person in the vehicle occupying the driver seat when use of the vehicle 102 is started as the current user of the vehicle 102, and, in the person-in-vehicle information 248, adds information to the identification information stored in association with the facial image of the current user to indicate that the person in the facial image is the current user.

In the present embodiment, the user identifying unit 244 identifies the person 130 occupying the driver seat of the vehicle 102 as a registered user and the current user, and identifies the person 132 as an unregistered user. Then, the user identifying unit 244 stores person-in-vehicle information 248 regarding the person 130 and the person 132 in the storage device 242.

The user information acquisition unit 246 references the person-in-vehicle information 248 stored by the user identifying unit 244, acquires information on the registered user who is the current user among the persons in the vehicle from the usage managing server 106, and stores the information in the storage device 242 as user information 249. The user information 249 may include, for example, a communication address for communicating with a mobile terminal of the registered user. In the present embodiment, the user information acquisition unit 246 stores the user information 249 including the communication address of the mobile terminal 160 of the person 130 who is a registered user and the current user in the storage device 242.

The vehicle control device 202 constituting the vehicle control system 100 instructs the BCM 208 to control an opening operation of the vehicle doors based on the vehicle exterior image and vehicle interior image received from the image acquisition device 204.

Specifically, the vehicle control device 202 includes a processing device 250 and a storage device 252. The storage device 252 is composed of, for example, a volatile and/or non-volatile semiconductor memory and/or a hard disk device. The processing device 250 is, for example, a computer having a processor such as a CPU. The processing device 250 includes as functional elements or functional units a person recognition unit 254 and a door control unit 256.

These functional elements of the processing device 250 are realized, for example, by the processing device 250, which is a computer, executing a program. This computer program may be stored on any computer-readable storage medium. As an alternative, part or all of the above functional elements of the processing device 250 may be constituted by hardware including respectively one or more electronic circuit components.

The person recognition unit 254 recognizes a motion of a person outside the vehicle and a motion of a person in the vehicle based on a vehicle exterior image and a vehicle interior image received from the image acquisition device 204. Specifically, the person recognition unit 254 recognizes a person outside the vehicle approaching the vehicle 102 (hereinafter also referred to as an approaching person). In addition, the person recognition unit 254 determines whether or not the person in the vehicle is performing a specific motion determined in advance with respect to the approaching person outside the vehicle. Here, the specific motion may be, as mentioned above, looking at the subject person, making a specific facial expression toward the subject person, and/or making a specific gesture toward the subject person, etc. In addition, the person recognition unit 254 determines whether or not each of the person outside the vehicle approaching the vehicle 102 and the person in the vehicle are performing any of the above specific motions determined in advance with each other as the subject person.

When the person outside the vehicle approaching the vehicle 102 has been recognized based on the recognition result of the person recognition unit 254, the door control unit 256 executes the opening operation on a door of the vehicle 102 when it has been determined that the person in the vehicle 102 has performed the above specific motion determined in advance with respect to the approaching person outside the vehicle.

For example, in the scenario shown in FIG. 1, the person recognition unit 254 detects the person 150 as a person outside the vehicle approaching the vehicle 102, and recognizes that the person 130, who is a person in the vehicle, is looking at the person 150 outside the vehicle. Then, based on the recognition result of the person recognition unit 254, the door control unit 256 instructs the BCM 208 to execute the opening operation on, for example, the door of the open seat closest to the person 150 outside the vehicle whom the person 130 in the vehicle is looking at, in other words the rear right seat door 126.

Alternatively, the door control unit 256 executes the opening operation on a door of the vehicle 102 when each of the person outside the vehicle approaching the vehicle 102 and the person in the vehicle 102 are performing any of the above specific motion with each other as the subject person.

In addition, the door control unit 256 references the person-in-vehicle information 248 from the user managing device 206, and if the person in the vehicle performing the specific motion with respect to the person outside the vehicle approaching the vehicle 102 is not a registered user, the door control unit 256 sends a specific notification to ask whether or not it may perform the opening operation on a door of the vehicle 102 to a person who is a registered user (for example, the current user). Then, when the person who is the registered user has returned an affirmative instruction to the specific notification, the door control unit 256 executes the opening operation on a door of the vehicle 102. The specific notification may include, for example, a facial image of the person outside the vehicle who is the subject person of the specific motion performed by the person in the vehicle.

When the person who is the registered user is in the vehicle 102, the specific notification may be performed by the display device 220. The door control unit 256 may be configured to perform the specific notification by the display device 220 via the UI control device 212 and to acquire the instruction input by the person who is the registered user into the touch panel 222. Alternatively, if the person who is the registered user is not in the vehicle 102, the specific notification may be performed via a mobile terminal of the registered user.

For example, in the scenario shown in FIG. 1, the person recognition unit 254 detects the person 146 as a person outside the vehicle approaching the vehicle 102, and recognizes that the person 132, who is a person in the vehicle, is looking at the person 146 outside the vehicle. In addition, based on the person-in-vehicle information 248, the door control unit 256 recognizes that the person 132 in the vehicle, who is performing the specific action of looking at the person 146 outside the vehicle, is an unregistered user.

Further, from the vehicle interior image received from the image acquisition device 204 and the person-in-vehicle information 248, the door control unit 256 detects that the person 130, who is a registered user, is in the vehicle, instructs the UI control device 212 to display, on the display device 220, the specific notification including a facial image of the person 146 to the person 130 in the vehicle who is the registered user. Then, when the person 130 inputs an affirmative instruction with respect to the notification into the touch panel 222, the door control unit 256 may instruct the BCM 208 to open, for example, the rear left seat door 128.

Alternatively, if the person 130 who is a registered user has exited the vehicle 102 as shown by the dash-dot arrow in the scenario of FIG. 1, the door control unit 256 detects from the vehicle interior image received from the image acquisition device 204 and the person-in-vehicle information 248 that the person 130 who is a registered user is not in the vehicle. Then, the door control unit 256 further acquires user information 249 from the user managing device 206, and acquires information on the mobile terminal 160 of the person 130 included in the user information.

This allows the door control unit 256 to send the specific notification including a facial image of the person 146 outside the vehicle whom the person 132, who is an unregistered user in the vehicle, has looked at, to the person 130 via the mobile terminal 160. Then, when the person 130 returns an affirmative instruction with respect to the notification via the mobile terminal 160, the door control unit 256 receives the instruction, and instructs the BCM 208 to open, for example, the rear left seat door 128.

Further, when the person recognition unit 254 has recognized a plurality of persons outside the vehicle approaching the vehicle 102, the door control unit 256 sends a notification including facial images of the recognized plurality of persons outside the vehicle to a person who is a registered user (for example, the current user). Then, when the person who is a registered user has returned an affirmative instruction with respect to the notification, the door control unit 256 executes the opening operation on a door of the vehicle 102. The notification and the instruction may be performed via the display device 220 and the touch panel 222 when the person who is the registered user is in the vehicle 102. Alternatively, when the person who is the registered user is not in the vehicle 102, the notification and the instruction may be performed via the mobile terminal of the person who is the registered user.

For example, in the scenario shown in FIG. 1, when the person 148 is moving in the direction of the vehicle 102 in addition to the person 146, the person recognition unit 254 recognizes the persons 146, 148 as persons outside the vehicle approaching the vehicle 102. This causes the door control unit 256 to send a notification including facial images of the recognized plurality of persons 146, 148 outside the vehicle to the person 130 in the vehicle who is a registered user via the display device 220 or the mobile terminal 160. Then, when the person 130 who is a registered user has returned an affirmative instruction with respect to the notification via the touch panel 222 or the mobile terminal 160, the door control unit 256 executes the opening operation on a door of the vehicle 102.

Here, in a case where the person recognition unit 254 has recognized a plurality of persons outside the vehicle approaching the vehicle 102 as described above, and it has been recognized that the person in the vehicle is performing the specific motion toward part of the recognized plurality of approaching persons outside the vehicle, the door control unit 256 may be configured not to include in the notification the facial image of the person outside the vehicle among the plurality of approaching persons outside the vehicle who is the subject person of the specific motion being performed by the person in the vehicle. For example, in the scenario shown in FIG. 1, the door control unit 256 may be configured not to include in the notification the facial image of the person 146 outside the vehicle whom the person 132 in the vehicle is looking at.

When the vehicle control system 100 having the above configuration detects a person outside the vehicle approaching the vehicle 102 and detects that the person in the vehicle 102 is performing a specific motion such as looking or smiling at the person outside the vehicle, the vehicle control system 100 executes the opening operation on a door of the vehicle 102. This allows the vehicle control system 100 to ensure security of the vehicle 102 while enabling smooth boarding by the person outside the vehicle even if the approaching person outside the vehicle is not a registered user.

Next, an operation of the vehicle control system 100 will be described. FIG. 3 is a flowchart showing a procedure of a process of the vehicle control system 100. This process starts when the vehicle 102 is stopped or parked, for example, when the vehicle speed is less than a predetermined speed (for example, 5 km/h). The devices constituting the vehicle control system 100 may acquire information regarding the vehicle speed of the vehicle 102 via the BCM 208 connected, for example, to a vehicle speed sensor (not shown).

Moreover, in parallel to the process shown in FIG. 3, the image acquisition device 204 is configured to acquire, at respective specific time intervals, vehicle interior images from the front seat camera 110 and rear seat camera 112, and vehicle exterior images from the front camera 114, right side camera 116, left side camera 118, and rear camera 120. In addition, in parallel to the process shown in FIG. 3, the user managing device 206 is configured to recognize persons boarding and exiting the vehicle 102 and store person-in-vehicle information 248 and user information 249 in the storage device 242 during a period from, for example when a specific operation indicating start of use of the vehicle 102 has been performed until a specific operation indicating end of use of the vehicle 102 has been performed.

Here, the above specific operation indicating start of use and specific operation indicating end of use may respectively be an "on" operation and an "off" operation of the ignition key of the vehicle 102, performed, for example, by the current user. The user managing device 206 may be configured to acquire an indication that an "on" operation or "off" operation has been performed with respect to the ignition key from the BCM 208 connected to, for example, an ignition key sensor (not shown).

When the process shown in FIG. 3 is started, the person recognition unit 254 of the vehicle control device 202 constituting the vehicle control system 100 starts a recognition process of a person outside the vehicle and a person in the vehicle based on vehicle exterior images and vehicle interior images acquired from the image acquisition device 204, to determine whether or not a person outside the vehicle approaching the vehicle 102 (approaching person) has been detected (S100). If no approaching person has been detected (S100, NO), the person recognition unit 254 returns to step S100 and waits for an approaching person to be detected.

On the other hand, when an approaching person has been detected (S100, YES), the person recognition unit 254 recognizes an action of a person in the vehicle 102 with respect to the detected approaching person (S102). Recognition of this action includes recognizing whether or not the person in the vehicle is performing a specific motion determined in advance with respect to any of the detected approaching persons. In addition to this, when the person in the vehicle has performed the specific motion with respect to the approaching person, the person recognition unit 254 may be configured to recognize whether or not the approaching person has also performed the specific motion determined in advance with respect to the person in the vehicle. Then, the person recognition unit 254 transmits the detection result of the approaching person outside the vehicle and information regarding the action of the person in the vehicle as a recognition result regarding the person outside the vehicle and the person in the vehicle to the door control unit 256.

Next, based on the recognition result, the door control unit 256 determines whether or not the detected approaching person is alone (S104). If the approaching person outside the vehicle is alone (S104, YES), the door control unit 256 determines, based on the recognition result, whether or not the person in the vehicle has performed the specific motion with respect to the approaching person (for example, looking or smiling at the approaching person) (S106). Then, if the person in the vehicle has performed the specific motion with respect to the approaching person (S106, YES), the door control unit 256 acquires and references the person-in-vehicle information 248 from the user managing device 206, to determine whether or not the person in the vehicle who has performed the specific motion is a registered user (S108).

Then, if the person in the vehicle who has performed the specific motion is not a registered user (S108, NO), the door control unit 256 references the person-in-vehicle information 248 and sends a specific notification including a facial image of the approaching person with respect to whom the person in the vehicle has performed the specific motion to a registered user who is using the vehicle 102 (for example, the above current user) (S110). This notification may be a notification for asking the registered user whether or not an opening operation of a door of the vehicle 102 may be performed. In addition, this notification may be performed by the display device 220 when the registered user using the vehicle 102 is in the vehicle 102, and may be performed via the mobile terminal of the registered user when the registered user is not in the vehicle 102.

Then, the door control unit 256 receives a response to the notification from the registered user who has received the specific notification (S112), and determines whether or not the response is an affirmative instruction (for example, an instruction to permit the door opening operation) with respect to the notification (S114). If the response does not provide an affirmative instruction with respect to the notification (S114, NO), the door control unit 256 returns the process to step S126.

On the other hand, if the response provides an affirmative instruction with respect to the notification (S114, YES), the door control unit 256 instructs the BCM 208 to execute the opening operation on any door of the vehicle 102 (S116). In this case, the door control unit 256 may be configured to determine, based on the recognition result, whether or not the approaching person outside the vehicle has also performed the specific motion with respect to the person in the vehicle who has performed the specific motion, and to execute the door opening operation if the approaching person has performed the specific motion.

Here, the door on which to execute the opening operation may be, for example, one of the passenger seat door 124, rear right seat door 126, and rear left seat door 128 which is a door of an empty seat closest to the approaching person outside the vehicle. Next, the door control unit 256 determines, based on the vehicle interior image, whether or not the approaching person outside the vehicle has boarded the vehicle 102 and the door has been closed (S118). If the door has not been closed (S118, NO), the process returns to step S118 and waits for the door to be closed.

On the other hand, if the door has been closed (S118, YES), the door control unit 256 determines whether or not the vehicle 102 has finished stopping or parking and has started to move (S126). The door control unit 256 may determine that the vehicle 102 has started to move when, for example, the vehicle speed of the vehicle 102 is equal to or greater than a predetermined speed (for example, 5 km/h). As described above, the door control unit 256 may be configured to acquire information regarding the vehicle speed of the vehicle 102 via, for example, the BCM 208. If the vehicle 102 has not started to move (S126, NO), the door control unit 256 returns the process to step S100. On the other hand, if the vehicle 102 has started to move (S126, YES), the door control unit 256 ends the process.

Alternatively, if it has been determined at step S108 that the person in the vehicle who has performed the specific motion with respect to the approaching person is a registered user (S108, YES), the door control unit 256 moves the process to step S116 and executes the opening operation on a door of the vehicle 102.

Alternatively, if it has been determined at step S106 that the person in the vehicle has not performed the specific motion with respect to the approaching person (S106, NO), the door control unit 256 moves the process to step S126.

Alternatively, if a plurality of approaching persons have been detected at step S104 (S104, NO), the door control unit 256, like at step S106, determines, based on the recognition result of the person recognition unit 254, whether or not the person in the vehicle has performed the specific motion with any of the approaching persons as a subject person (S120).

If the person in the vehicle has performed the specific motion with any of the approaching persons as a subject person (S120, YES), the door control unit 256 references the person-in-vehicle information 248 and sends a specific notification including facial images of the approaching persons excluding the subject person to the registered user who is using the vehicle 102 (for example, the above current user) (S122). Then, the door control unit 256 moves the process to step S112.

On the other hand, if the person in the vehicle has not performed the specific motion with any of the approaching persons as a subject person (S120, NO), the door control unit 256 references the person-in-vehicle information 248 and sends a specific notification including facial images of all the approaching persons to the registered user who is using the vehicle 102 (for example, the above current user) (S124). Then, the door control unit 256 moves the process to step S112.

The specific notification of steps S122 and S124, like the specific notification of step S110, may be a notification for asking whether or not the opening operation may be performed on a door of the vehicle 102. In addition, these notifications may be performed by the display device 220 when the registered user using the vehicle 102 is in the vehicle 102, and may be performed via the mobile terminal of the registered user when the registered user is not in the vehicle 102.

It should be noted that the present invention is not limited to the configuration of the embodiment described above, and that it may be implemented in various forms within a scope that does not depart from the gist of the invention.

For example, the present embodiment describes an example in which one registered user who is the current user (person 130) and one unregistered user (person 132) are in the vehicle 102, but the makeup of occupants in the vehicle 102 is not so limited. There may be no unregistered users in the vehicle 102, or there may be several unregistered users. Further, in addition to the registered user who is the current user, any number of registered users may occupy the vehicle 102.

Further, in the present embodiment, at step S106 of FIG. 3, the door control unit 256 of the vehicle control device 202 determines whether or not the person in the vehicle has performed the specific motion with respect to the approaching person, but the form of the determination is not so limited. The door control unit 256 may be configured to determine whether or not the person in the vehicle has continued to perform the specific motion for a predetermined period of time or longer with respect to the approaching person. As this makes it possible to prevent the door from opening if the person in the vehicle mistakes the approaching person for someone else and performs the specific motion for a short time (about 0.1 to 2 seconds), security can be improved.

Further, at step S106 of FIG. 3, the door control unit 256 may be configured to determine, based on the recognition result of the person recognition unit 254, whether or not each of the approaching person and the person in the vehicle has performed any of the specific motions determined in advance described above with each other as the subject person. If the approaching person and the person in the vehicle have performed any of the specific motions with each other as the subject person, the door control unit 256 may perform the processes of steps S108 and onward.

Further, in the present embodiment, at steps S110, S122, and/or S124 of FIG. 3, the door control unit 256 of the vehicle control device 202 is configured to send the specific notification to the registered user who is the current user, but the subject of the specific notification is not limited to the registered user who is the current user. If a plurality of registered users are in the vehicle 102 as described above, the door control unit 256 may be configured to send the specific notification to the registered user who is the current user and/or to another registered user.

In this case, the specific notification may be sent to a plurality of registered users, or to one registered user in the vehicle 102 who has the highest level of priority at the time according to a priority order assigned to the registered users in the vehicle 102. This priority order may, for example, be determined in advance by the registered user who is the current user and stored in the storage device 252, or it may be determined by the user identifying unit 244 of the user managing device 206 according to predetermined criteria (for example, the order of age of the registered users indicated by the user information 249) and instructed to the door control unit 256.

In addition, in the present embodiment, the vehicle 102 is a four-door vehicle, but is not so limited. The vehicle 102 may be a vehicle having any number of doors equal to or more than two.

In addition, in the present embodiment, the position at which the front camera 114 is provided is, for example, the front bumper of the vehicle 102, but it is not so limited. The front camera 114 may be configured in one piece with the front seat camera 110 and be provided on the rear-view mirror of the vehicle 102.

In addition, in the present embodiment, the position at which the front seat camera 110 is provided is, for example, the rear-view mirror of the vehicle 102, but it is not so limited. The front seat camera 110 may be mounted on, for example, the dashboard of the vehicle 102.

In addition, in the present embodiment, the number of persons outside the vehicle 102 approaching the vehicle 102 is two (persons 146, 150) or three (persons 146, 148, 150), but the number of approaching persons may be any number.

In addition, in the present embodiment, the door control unit 256 performs the door opening operation when a specific motion performed by the person in the vehicle with respect to an approaching person outside the vehicle has been detected, but the door opening operation may be performed when a specific condition is satisfied in addition to the specific motion. For example, in the present embodiment, the act of looking at or turning one's face toward the approaching person is shown as one specific motion that the person in the vehicle performs with respect to the approaching person, but these motions may also be detected when paying attention to the behavior of a suspicious person approaching the vehicle 102.

Therefore, in a case in which, for example, a specific motion such as looking at or turning the face toward an approaching person has been detected, the door control unit 256 may be configured to perform the door opening operation on the condition that, for example, there are no characteristics of tension (an expression of dislike, a startled expression, etc.) in the facial expression of the person in the vehicle who has performed the specific motion. In this case, whether or not the person in the vehicle shows an expression characteristic of tension may be recognized according to conventional techniques by the person recognition unit 254 of the vehicle control device 202.

In addition, the door control unit 256 may change the door opening operation according to the situation outside the vehicle. For example, the door control unit 256 may be configured to perform automatic opening as the door opening operation if there is only one approaching person outside the vehicle, and simply unlock the door or provide a doorknob (eject the doorknob from the door body) as the door opening operation if there are several approaching persons. This makes it possible to reduce the possibility of approaching persons who are not subject persons of the specific motion boarding the vehicle uninvited when there are several approaching persons.

In addition, in the present embodiment, the vehicle control system 100 is composed of a plurality of devices (the vehicle control device 202, the image acquisition device 204, and the user managing device 206), but the configuration of the vehicle control system 100 is not so limited. The vehicle control system 100 may be composed of fewer or more devices than this. One or several of such devices may be provided to the usage managing server 106 and/or another server which is provided outside the vehicle 102 and is communicably connected to the onboard devices. Alternatively, the vehicle control system 100 may be configured as one device in the vehicle 102.

As described above, the vehicle control system 100 according to the present embodiment includes a vehicle exterior image acquisition unit 232 which acquires a vehicle internal image which is an image of the external surroundings of the vehicle 102, and a vehicle interior image acquisition unit 234 which acquires a vehicle interior image which is an image of the interior of the vehicle 102. In addition, the vehicle control system 100 includes a person recognition unit 254 which respectively recognizes motions of a person outside the vehicle and a person inside the vehicle interior based on the vehicle exterior image and the vehicle interior image, and a door control unit 256 which controls a state of a door of the vehicle 102. When a person outside the vehicle approaching the vehicle 102 (approaching person) has been recognized based on the recognition result of the person recognition unit 254, and it has been determined that the person in the vehicle has performed a specific motion determined in advance with respect to the approaching person, the door control unit 256 executes an opening operation on a door of the vehicle 102.

According to this configuration, it is possible to ensure security of the vehicle while enabling smooth boarding by persons other than registered users of the vehicle (registered users).

In addition, in the vehicle control system 100, the door control unit 256 executes the door opening operation when each of the person in the vehicle and the approaching person has performed any of the specific motions determined in advance with each other as the subject person. According to this configuration, the person in the vehicle and the approaching person are associated with each other, which allows for further improving security of the door opening operation.

In addition, in the vehicle control system 100, the specific motion is to keep directing the face or gaze toward the subject person for a predetermined period of time or longer. According to this configuration, smooth boarding by persons other than registered users of the vehicle (registered users) can be enabled with a simple process.

In addition, in the vehicle control system 100, the specific motion is a specific facial expression being formed or a specific gesture being performed with respect to the subject person. According to this configuration, the door opening operation is executed by detecting various motions that people may perform when spotting an acquaintance, etc., which makes it possible to further improve convenience of the vehicle 102.

In addition, the vehicle control system 100 includes a user identifying unit 244 which determines whether or not the person in the vehicle 102 is a registered user who has been registered in advance as a user of the vehicle 102. If the person in the vehicle performing the specific motion with the approaching person as the subject person is not a registered user, the door control unit 256 sends a specific notification to a registered user of the vehicle 102, and executes the door opening operation if the registered user returns an affirmative instruction with respect to the notification.

Thus, in a case where, for example, a child who is an unregistered user waves his or her hand at an unknown approaching person, this configuration makes it possible to prevent the door opening operation from being performed by the detection of the handwaving motion, which allows for further improving of security.

In addition, in the vehicle control system 100, when the person recognition unit 254 has recognized a plurality of approaching persons, the door control unit 256 sends a notification including facial images of the plurality of approaching persons to the registered user, and executes the door opening operation if the registered user returns an affirmative instruction with respect to the notification.

According to this configuration, it is possible to prevent the door opening operation from being inadvertently performed in a case where there are several approaching persons outside the vehicle and it is difficult to recognize which approaching person outside the vehicle is the subject person of the specific motion performed by the person in the vehicle, or in a case where there is a possibility that the door opening operation may let an approaching person other than the subject person board the vehicle, which further improves security.

In addition, in the vehicle control system 100, among the plurality of recognized approaching persons, the door control unit 256 does not include in the notification the facial image of the subject person of the specific motion performed by the person in the vehicle. According to this configuration, the number of facial images of subject persons included in the notification is reduced, which allows the registered user to quickly determine whether to permit execution of the door opening operation.

In addition, in the vehicle control system 100, the door opening operation is an automatic operation of opening the doors, or setting the doors to be openable from outside the vehicle 102. According to this configuration, the door control unit 256 is able to support smooth boarding by approaching persons outside the vehicle not only by automatically opening the doors, but by various operations such as unlocking the doors, ejecting a doorknob stowed in the door to be in an operable state, etc.

In addition, by means of a computer that performs vehicle control, the vehicle control system 100 executes a vehicle control method that performs the following process. The vehicle control method includes a step of acquiring a vehicle exterior image, which is an image of the external surroundings of the vehicle 102, a step of acquiring a vehicle interior image, which is an image of the interior of the vehicle 102, a step of respectively recognizing, based on the vehicle exterior image and the vehicle interior image, motions of a person outside the vehicle and a person in the interior of the vehicle, and a step of controlling the state of the doors of the vehicle 102. If a person outside the vehicle approaching the vehicle 102 (approaching person) has been recognized based on the recognition result of the above step of recognizing, then, at the above step of controlling, the door opening operation of the vehicle 102 is executed if it has been determined that the person in the vehicle has performed a specific motion determined in advance with respect to the approaching person.

According to this configuration, it is possible to ensure security of the vehicle while enabling smooth boarding by persons other than registered users of the vehicle (registered users).

REFERENCE SIGNS LIST

100 Vehicle control system
102 Vehicle
104 Communication network
106 Usage managing server
108 Station
110 Front seat camera
112 Rear seat camera
114 Front camera
116 Right side camera
118 Left side camera
120 Rear camera
122 Driver seat door
124 Passenger seat door
126 Rear right seat door
128 Rear left seat door
130, 132, 140, 142, 144, 146, 148, 150 Person
160 Mobile terminal
200 Onboard network bus
202 Vehicle control device
204 Image acquisition device
206 User managing device
208 BCM
210 TCU
212 UI control device
214 Near-field communication device
216 Long-range communication device
218 Processing device
220 Display device
222 Touch panel
224 Speaker
226 Microphone
230, 240, 250 Processing device
232 Vehicle exterior image acquisition unit
234 Vehicle interior image acquisition unit
242, 252 Storage device
244 User identifying unit
246 User information acquisition unit
248 Person-in-vehicle information
249 User information 254 Person recognition unit
256 Door control unit

What is claimed is:

1. A vehicle control system comprising a processor and a memory, wherein the processor:
   acquires a vehicle exterior image obtained by capturing any one of a front area, a right area, a left area, and a rear area of a vehicle;
   acquires a vehicle interior image, which is an image of an interior of the vehicle;
   respectively recognizes, based on the vehicle exterior image and the vehicle interior image, motions of a person outside the vehicle and a person in the vehicle; and
   controls a state of a door of the vehicle,
   wherein,
   a facial image of a registered user registered as a user of the vehicle is recorded in advance in the memory,
   the processor
   for each person in the vehicle, compares the facial image of the registered user recorded in the memory with the face of the person in the in-vehicle image to determine whether or not each person in the vehicle is the registered user,
   recognizes a motion of a person outside the vehicle and the registered user in the vehicle from the vehicle exterior image and the vehicle interior image, and when it is determined based on a recognition result that the registered user in the vehicle and the approaching person outside the vehicle performed a specific motion determined in advance toward each other, executes an opening operation on the door closest to the approaching person outside the vehicle.

2. The vehicle control system according to claim 1, wherein the specific motion is to keep directing one's face or gaze toward a subject person for a predetermined period of time or longer.

3. The vehicle control system according to claim 1, wherein the specific motion is a specific facial expression being formed or a specific gesture being performed with respect to a subject person.

4. The vehicle control system according to claim 1,
   wherein the processor sends a specific notification to the registered user of the vehicle if the person in the vehicle who has performed the specific motion with the approaching person outside the vehicle as a subject person is not the registered user, and executes the opening operation on the door when the registered user has returned an affirmative instruction with respect to the specific notification.

5. The vehicle control system according to claim 1,
   wherein, if unit the processor has recognized a plurality of the approaching persons outside the vehicle, the processor sends a notification including facial images of the recognized plurality of approaching persons outside the vehicle to the registered user, and executes the opening operation on the door when the registered user has returned an affirmative instruction with respect to the notification.

6. The vehicle control system according to claim 5, wherein, among the recognized plurality of approaching persons outside the vehicle, the processor does not include in the notification a facial image of a subject person of the specific motion of the person in the vehicle.

7. The vehicle control system according to claim 1, wherein the opening operation is an automatic operation of opening the door, or an operation of setting the door to be openable from outside the vehicle.

8. A vehicle control method executed by a computer performing vehicle control, the method comprising the steps of:
   acquiring a vehicle exterior image, which is an image obtained by capturing any one of a front area, a right area, a left area, and a rear area of a vehicle;
   acquiring a vehicle interior image, which is an image of an interior of the vehicle;
   respectively recognizing, based on the vehicle exterior image and the vehicle interior image, motions of a person outside the vehicle and a person in the vehicle;
   controlling a state of a door of the vehicle;
   recording a facial image of a registered user registered as a user of the vehicle in advance;
   for each person in the vehicle, determining whether or not each person in the vehicle is the registered user by comparing the facial image of the registered user recorded with the face of the person in the in-vehicle image;
   recognizing a motion of a person outside the vehicle and the registered user in the vehicle from the from the vehicle exterior image and the vehicle interior image, and when it is determined based on a recognition result that the registered user in the vehicle and the approaching person outside the vehicle performed a specific motion determined in advance toward each other, executing an opening operation of the door closest to the approaching person outside the vehicle.

* * * * *